Patented Feb. 19, 1952

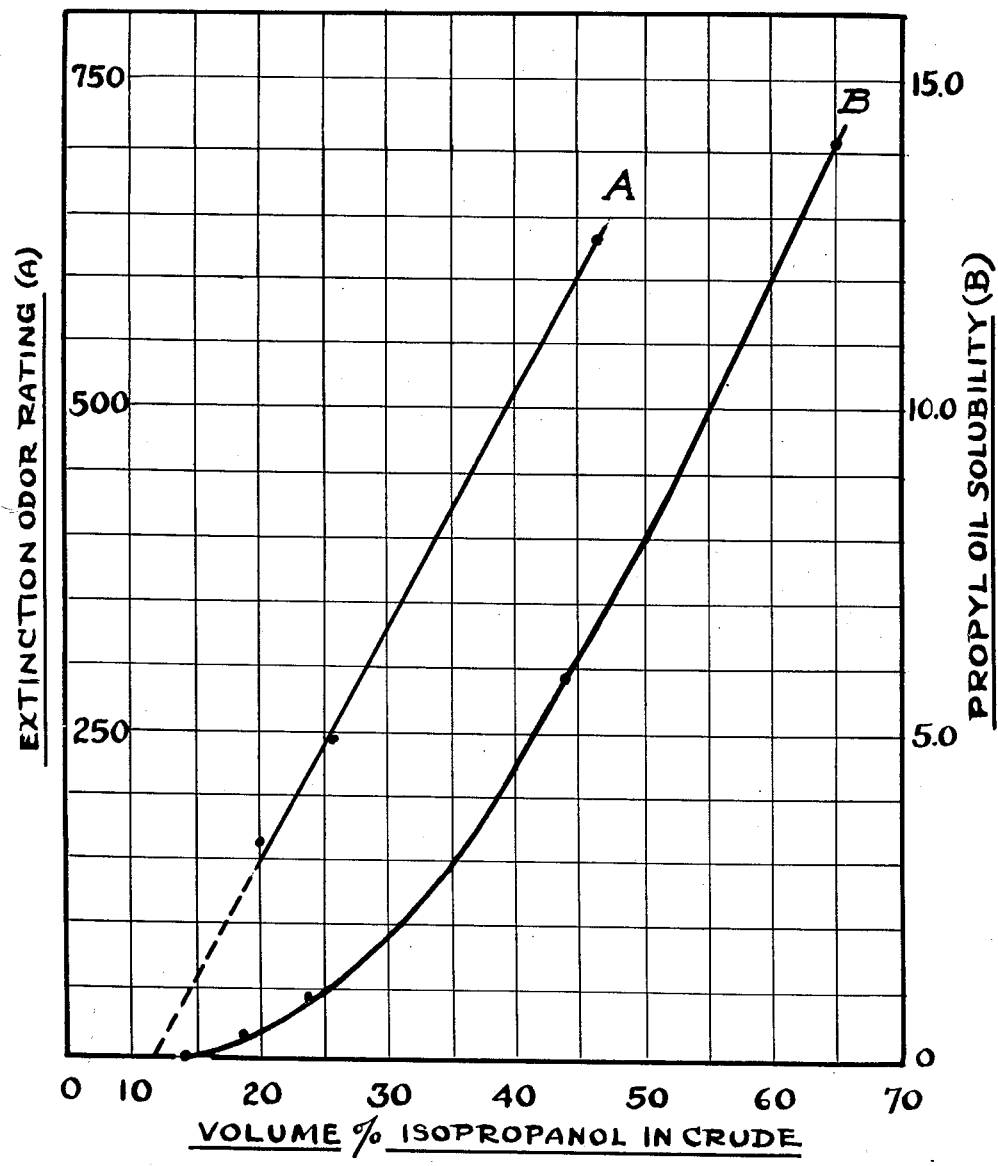

2,586,602

UNITED STATES PATENT OFFICE 2,586,602

PURIFICATION OF ALCOHOLIC LIQUID

Sidney B. Beddow, Linden, N. J., assignor to Standard Oil Development Company, a corporation of Delaware Application August 7, 1947, Serial No. 767,187

2 Claims. (Cl. 260—639)

This invention relates to the purification of aliphatic alcohols, and specifically to the deodorization of aliphatic alcohols, especially those of one to five carbon atoms. More particularly, the invention relates to a process whereby a malodorous alcoholic liquor is treated to remove the malodorous impurities therefrom.

It is well known that alcohols, particularly those produced by the acid-catalyzed hydration of olefin hydrocarbons, possess a distinct and apparent foreign odor, slightly penetrating and for the most part disagreeable. While no attempt will be made to definitely assign the disagreeable odor of alcohols prepared by olefin hydration to the presence of any one or combination of chemical compounds, it can be said with reasonable assurance that the odor of crude alcohol depends to a large extent on the quality of the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor particularly sulfur compounds such as hydrogen sulfide, alkyl sulfides and mercaptans. These materials present, even in minute amounts, in the olefin stream to the acid catalyzed hydration process are believed to contribute to the obnoxious odor of the crude alcohol since, while sulfur alone has no smell, it is clear that in combination with other elements it is a powerful odoriferous agent. The bad odor of alcohols has also been attributed to the presence of so-called high-boiling polymer products formed in side reactions during the alcohol process. The odor of the polymer products is strengthened by the presence of any sulfur compounds dissolved therein, although the odor of some of the pure polymers themselves is by no means pleasing to the olfactory sense. A typical analysis of a sample of the so-called polymer product, in this case the so-called propyl oil, resulting from the production of isopropyl alcohol by the sulfuric acid catalyzed hydration of propylene, is as follows:

55 weight per cent sec.-heptanol (B. P. 137–140° C.)
21 weight per cent sec.-octanol (B. P. 160–165° C.)
2 weight per cent $C_7$ ketone (B. P. 131° C.)
13 weight per cent hydrocarbons (B. P. above 180°C.)
9 weight per cent ethers (B. P. above 160° C.)
Traces of sulfur compounds The composition of the propyl oil or so-called high-boiling polymers obtained during the concentration of dilute crude isopropanol varies according to the point from which the alcohol containing it is withdrawn in the concentration tower, and the odor likewise varies. Cuts can be identified with an odor of camphor, some of menthol odor, etc. It has also been reported that the presence of nitrogen compounds attributes to the odor of alcohols.

Since the odor of the alcohol appears to be associated with the so-called high-boiling polymer oil, and since any other malodorous impurities are likely to be soluble therein, it has been customary to dilute the crude alcohol distillate resulting from the steam stripping of the olefin-hydrolysis operation with water. Since the high-boiling polymer oils are insoluble in water, they are thrown out of solution and separate out as an oil layer which can be removed. The dilute aqueous alcoholic liquid is then reconcentrated to the desired strength. Customary dilution with water proceeds to the extent of 35%–40% alcoholic solution, i. e. 35%–40% alcohol and 65%–60% water. The 35%–40% dilution figure has been maintained for two reasons: first, it was thought that at this dilution all the polymer oils were thrown out of solution and secondly, excessive dilution was considered uneconomical in view of the heat requirements necessary to reconcentrate the alcohol, e. g. as by fractionation.

It has now been found that the odor of a malodorous crude alcoholic liquid (e. g. a 70% alcohol distillate) can be surprisingly improved and the water-insoluble oily impurities completely removed therefrom by diluting the crude distillate with water in one or more stages to a 15% dilution or below (i. e. 85% water–15% alcohol, 86% water–14% alcohol, etc.), separating the oily polymer layer which forms from the aqueous alcohol, e. g. by decantation, and reconcentrating the aqueous alcohol solution to the desired strength. Although it had formerly been thought that maximum polymer oil removal had been attained by diluting to 35%–40% alcohol strength, it has been found that dilution of 15% or below produces approximately 22% more polymer oil than was formed at 35%–40% dilution, and that the odor of the alcohol produced on reconcentration is substantially improved so much so that the product meets odor specifications for sale on the market in such highly desirable formulations for barber supplies, antiseptics, perfumes, drugs, biologicals, vitamins, and a myriad of related uses.

Although the invention will be illustrated and exemplified by the deodorization of isopropyl alcohol, it is equally applicable to the purification of any aliphatic alcohol particularly those containing one to five carbon atoms.

Example

In the manufacture of isopropanol the isopropyl extract resulting from the absorption of propylene in sulfuric acid or the like, is hydrolyzed by dilution with water and steam distilled to recover crude alcohol distillate. This crude distillate usually contains about 65%–70% by volume of isopropyl alcohol, the balance being oily impurities, but predominately water. This distillate is sometimes hazy or cloudy in appearance or becomes so upon addition of small amounts of water, or upon being subjected to temperature change. It is customary to dilute the crude distillate to 35–40 volume per cent with water in order to remove insoluble oily impurities (propyl oil) as an upper layer. Subsequent concentration of the 35%–40% alcohol solution yields a product of poor and non-uniform odor. Further dilution of the 35%–40% aqueous solution to 15% dilution yields an additional volume of upper oily layer equivalent to approximately 22% of that removed when dilution is carried to only 35%. Removal of impurities as an upper layer is substantially complete by dilution to 15% by volume since no additional upper layer is formed upon further dilution. Subsequent concentration by fractionation of the 15% solution yields a product of superior odor. Solutions of 35% and 15% respectively have been concentrated by fractionation under like conditions and like cuts have been compared with respect to odor. In all cases the cuts from the 15% solution were vastly superior in odor rating to the corresponding cuts from the 35% solution.

As the dilution of the crude distillate with water proceeds, it has been found that the odor extinction rating[1] of the weak crude improves linearly with reduction in isopropanol concentration. In addition, the settling characteristics of the resultant weak crude are improved since the surface tension is raised (from 30 to 43 dynes/cm.) and the viscosity reduced (from 3 to 1 centipoises).

Dilution of the isopropanol crude distillate (70% isopropanol) to 45% with water yielded an upper oily layer (propyl oil) containing 0.045 weight per cent sulfur. Continued dilution to 15% isopropanol with water yielded an upper oily layer containing an increased sulfur content of 0.059 weight per cent. Since the odor of the 15% crude was found to be superior to the 45% crude, it is believed that odor improvement may be due in part to the further removal of sulfur compounds in the upper or oily layer.

The accompanying drawing indicates for isopropyl alcohol the variation of the odor extinction rating[1] and the solubility of the oily impurity layer (propyl oil) with the extent of dilution of the crude alcohol, i. e. with the volume per cent isopropanol in the diluted propyl distillate. It will be seen that the odor extinction rating improves linearly as the dilution proceeds, and that the solubility of the oily upper layer is great at high alcohol concentration, e. g. between 35% and 70% and that the slope of the curve diminishes sharply below about 35% dilution and straightens out entirely at 15% dilution, indicating that at 15% dilution and below, the propyl oil is completely insoluble. It is also to be noted that the curve of solubility of propyl oil (ml. propyl oil$\times 10^{-3}$ per equivalent of 1 ml. of 91% isopropanol in crude), and the curve of odor extinction rating cross below 15% dilution indicating that a 15% crude isopropanol, therefore, not only has a minimum of soluble oily impurity (propyl oil) dissolved therein, but also possesses an extinction odor rating approaching the minimum. In addition, as stated previously, the 15% crude also possesses improved surface tension and viscosity characteristics which favor the separation of the oil which is no longer in solution, thus emulsion and settling troubles are avoided.

It should be noted that odor removal may be accomplished by other procedures such as by oxidation or hydrogenation of the impurities, by chemical treatment such as caustic treating or treating with caustic plus cuprous chloride, but these methods are expensive and call for introduction of additional reagents which in some instances give rise to the formation of other impurities. The process as described in this invention represents but a small fraction of the cost of the above methods. By diluting the crude to 15% volume with water, overloading of the finishing columns might occur but this can easily be eliminated by utilizing a stripper column to concentrate the 15% crude before it enters the finishing columns.

Although the process of this invention has been found to produce alcohols of superior odor it is not intended that the invention be restricted to any theory by which this improvement is accomplished. It appears that the problem of deodorization is one of purification, however, it is granted that there are some impurities which possess less odor than the pure alcohol itself. Such impurities would therefore not lower the quality of the alcohol from an odor standpoint. On the other hand only very minute amounts of some impurities need be present in order to completely change or obscure the true odor of the alcohol. For example, if one part of vanillin is added to 100,000 parts of isopropanol the predominant odor is that of vanillin. It follows therefore, that the presence of one or more foreign components in an olefin stream, even in amounts small enough to avoid detection by ordinary chemical analysis could produce a characteristic undesirable odor or range of odors in the resulting alcohol product.

Having described the invention in terms clear and understandable to those skilled in the art so that they may practice the same, what is claimed is:

1. A process for producing isopropanol of improved odor characteristics which comprises absorbing propylene in sulfuric acid to form an isopropyl extract, hydrolyzing the extract with water, steam distilling the extract to produce a crude isopropanol distillate containing approximately 65 to 70% by volume of isopropyl alcohol, diluting the crude distillate with water until the isopropanol is blended with more than 65 volume per cent water but not more than 85 volume per cent water based on total blend, whereby an oily liquid layer containing malodorous impurities and an aqueous layer containing the isopropanol are formed, removing the oily layer of impurities and stripping purified isopropanol of improved odor from the aqueous isopropanol layer.

2. A process according to claim 1 in which the dilution with water occurs in stages.

SIDNEY B. BEDDOW.

REFERENCES CITED

The following references are of record in the file of this patent:

UNITED STATES PATENTS

| Number | Name | Date |
|---|---|---|
| 79,499 | Pollock | June 30, 1868 |
| 604,996 | Maiche | May 31, 1898 |
| 1,498,274 | Heuser | June 17, 1924 |
| 2,080,111 | Bump | May 11, 1937 |
| 2,313,196 | Guinot | Mar. 9, 1943 |
| 2,368,931 | Leum et al. | Feb. 6, 1945 |

---

[1] A portion of crude alcohol equivalent to 1 ml. of 91% isopropanol is blended with the odor standard (91% IPOH) until the blend is equivalent in odor to the odor standard itself. The odor extinction rating is equal to the volume of odor standard required.